(12) United States Patent
Sakamine et al.

(10) Patent No.: US 11,167,458 B2
(45) Date of Patent: Nov. 9, 2021

(54) METHOD FOR PRODUCING GOLF BALL

(71) Applicant: Sumitomo Rubber Industries, Ltd., Kobe (JP)

(72) Inventors: Ryota Sakamine, Kobe (JP); Kazuyoshi Shiga, Kobe (JP); Hikaru Nagakura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 195 days.

(21) Appl. No.: 16/233,973

(22) Filed: Dec. 27, 2018

(65) Prior Publication Data

US 2019/0202095 A1 Jul. 4, 2019

(30) Foreign Application Priority Data

Dec. 28, 2017 (JP) ................. 2017-252826

(51) Int. Cl.
*B29C 45/14* (2006.01)
*B29C 45/00* (2006.01)
(Continued)

(52) U.S. Cl.
CPC .......... *B29C 45/0001* (2013.01); *A63B 45/00* (2013.01); *B29B 7/005* (2013.01); *B29B 7/7495* (2013.01); *B29B 7/90* (2013.01); *B29C 45/14819* (2013.01); *C08K 3/22* (2013.01); *C08K 3/30* (2013.01); *C08K 5/56* (2013.01); *A63B 37/0062* (2013.01); *A63B 37/0064* (2013.01); *A63B 37/0065* (2013.01); *A63B 37/0074* (2013.01); *A63B 37/0075* (2013.01); *A63B 37/0076* (2013.01); *A63B 2102/32* (2015.10); *B29B 7/183* (2013.01); *B29B 7/286* (2013.01); *B29K 2009/00* (2013.01);
(Continued)

(58) Field of Classification Search
None
See application file for complete search history.

(56) References Cited

U.S. PATENT DOCUMENTS 4,483,537 A 11/1984 Hanada et al.
6,413,464 B1 * 7/2002 Tanaka ................ A63B 45/00
264/328.2
(Continued)

FOREIGN PATENT DOCUMENTS

JP 57-25337 A 2/1982
JP 58-118775 A 7/1983

*Primary Examiner* — Edmund H Lee
(74) *Attorney, Agent, or Firm* — Birch, Stewart, Kolasch & Birch, LLP.

(57) ABSTRACT

An object of the present invention is to provide a method for obtaining a golf ball having excellent impact durability. The present invention provides a method for producing a golf ball, comprising a first step of kneading (a) a base rubber, (b) an α,β-unsaturated carboxylic acid having 3 to 8 carbon atoms and/or a metal salt thereof as a co-crosslinking agent, (c) a crosslinkable compound having two or more polymerizable unsaturated bonds in a molecule thereof, and (d) a crosslinking initiator to prepare a core rubber composition; a second step of producing the spherical core from the core rubber composition at a molding temperature in a range from 100° C. to 150° C.; and a third step of molding the at least one cover layer covering the spherical core on the spherical core.

18 Claims, 1 Drawing Sheet

(51) Int. Cl.
*B29B 7/90* (2006.01)
*C08K 5/56* (2006.01)
*C08K 3/22* (2006.01)
*C08K 3/30* (2006.01)
*A63B 45/00* (2006.01)
*B29B 7/00* (2006.01)
*B29B 7/74* (2006.01)
*A63B 37/00* (2006.01)
*A63B 102/32* (2015.01)
*B29K 9/00* (2006.01)
*B29K 509/00* (2006.01)
*B29K 105/24* (2006.01)
*B29L 31/54* (2006.01)
*B29B 7/18* (2006.01)
*B29B 7/28* (2006.01)

(52) U.S. Cl.
CPC ...... *B29K 2105/24* (2013.01); *B29K 2509/00* (2013.01); *B29L 2031/546* (2013.01); *C08K 2003/2296* (2013.01); *C08K 2003/3045* (2013.01)

(56) References Cited

U.S. PATENT DOCUMENTS

2002/0042311 A1* 4/2002 Watanabe .............. A63B 37/06
 473/371
2007/0264222 A1* 11/2007 Georgiades .......... A61K 36/185
 424/74

* cited by examiner

METHOD FOR PRODUCING GOLF BALL

FIELD OF THE INVENTION

The present invention relates to a method for producing a golf ball.

DESCRIPTION OF THE RELATED ART

Conventionally, a golf ball comprising a spherical core formed from a rubber composition and a cover covering the spherical core has been proposed. The golf ball is usually used repeatedly. Thus, the golf ball is desired to have impact durability. As a method for improving the impact durability of the golf ball, a method of adding a polyfunctional compound in the rubber composition constituting the core has been proposed.

For example, Japanese Patent Publication No. S57-25337 A discloses a golf ball formulation containing a polybutadiene as a base material, and a mixture of a polyfunctional unsaturated ester and an unsaturated carboxylic acid as a polymerization crosslinkable monomer which is added in the polybutadiene in an amount of 20 to 35 weight by parts with respect to 100 weight by parts of the polybutadiene.

In addition, Japanese Patent Publication No. S58-118775 A discloses a golf ball obtained by heat crosslinking a composition containing 100 weight by parts of a polybutadiene rubber, 15 to 25 weight by parts of acrylic acid or methacrylic acid, 1 to 15 weight by parts of an ester of acrylic acid or methacrylic acid, 20 to 70 weight by parts of zinc oxide, and 1 to 6 weight by parts of an organic peroxide to form a solid core having a diameter of from 36.5 mm to 39.0 mm, and covering a composition containing 100 weight by parts of an ionomer resin, 0.5 to 10 weight by parts of a metal salt of acrylic acid or methacrylic acid, and 1 to 5 weight by parts of a coloring agent in a thickness of from 1.8 mm to 2.3 mm on the solid core.

SUMMARY OF THE INVENTION

If a crosslinkable compound having two or more polymerizable unsaturated bonds is added in a rubber composition constituting a core, the crosslinkable compound may self-polymerize by heat when molding the core. If the self-polymerization of the crosslinkable compound dominantly occurs, a three-dimensional crosslinking formed by the crosslinkable compound is insufficient, and thus the impact durability improvement effect of the core may not be obtained.

The present invention has been made in view of the above-described situation, and an object of the present invention is to provide, in a method for producing a golf ball using a rubber composition containing a crosslinkable compound having two or more polymerizable unsaturated bonds, a method for producing a golf ball having an excellent impact durability by suppressing the self-polymerization of the crosslinkable compound having two or more polymerizable unsaturated bonds.

The present invention provides a method for producing a golf ball comprising a spherical core and at least one cover layer covering the spherical core, wherein the method comprises: a first step of kneading (a) a base rubber, (b) an $\alpha,\beta$-unsaturated carboxylic acid having 3 to 8 carbon atoms and/or a metal salt thereof as a co-crosslinking agent, (c) a crosslinkable compound having two or more polymerizable unsaturated bonds in a molecule thereof, and (d) a crosslinking initiator to prepare a core rubber composition; a second step of producing the spherical core from the core rubber composition at a molding temperature in a range from 100° C. to 150° C.; and a third step of molding the at least one cover layer covering the spherical core on the spherical core.

In the method for producing the golf ball according to the present invention, the self-polymerization of (c) the crosslinkable compound by heat can be suppressed by controlling the core molding temperature within the range of from 100° C. to 150° C. As a result, in the obtained core, a three-dimensional crosslinked structure is sufficiently formed by (c) the crosslinkable compound, and thus the impact durability of the obtained core is improved.

According to the present invention, a golf ball having excellent impact durability is obtained.

DESCRIPTION OF THE PREFERRED EMBODIMENT

The present invention provides a method for producing a golf ball comprising a spherical core and at least one cover layer covering the spherical core, wherein the spherical core is formed from a core rubber composition (hereinafter sometimes simply referred to as "rubber composition") containing at least (a) a base rubber, (b) an $\alpha,\beta$-unsaturated carboxylic acid having 3 to 8 carbon atoms and/or a metal salt thereof as a co-crosslinking agent, (c) a crosslinkable compound having two or more polymerizable unsaturated bonds in the molecule thereof, and (d) a crosslinking initiator.

The method for producing the golf ball according to the present invention comprises a first step of preparing a rubber composition, a second step of heat pressing the rubber composition to mold a spherical core, and a third step of forming at least one cover layer on the spherical core.

(1) First Step

In the first step, (a) the base rubber, (b) the $\alpha,\beta$-unsaturated carboxylic acid having 3 to 8 carbon atoms and/or the metal salt thereof as the co-crosslinking agent, (c) the crosslinkable compound having two or more polymerizable unsaturated bonds in the molecule thereof, and (d) the crosslinking initiator are kneaded to prepare the rubber composition. It is noted that in the present invention, "knead" means mixing and dispersing various materials with different properties in the base rubber according to the formulation of the rubber composition by applying a mechanical shear force to the various materials.

In the first step, when kneading the materials, all the materials may be kneaded at one time, or alternatively a part of the materials is kneaded and then the rest materials are kneaded. The kneading of the materials is preferably performed, for example, by using a conventional kneading machine such as a roll, a kneader, and a banbury mixer. In light of improving kneading efficiency, the kneader or banbury mixer providing a great shear force is preferably used.

The kneading temperature for preparing the rubber composition is preferably 95° C. or more, more preferably 100° C. or more, and is preferably 125° C. or less, more preferably 120° C. or less. If the kneading temperature is 95° C. or more, the materials can be dispersed more uniformly and thus the performance of the materials is further exerted, and if the kneading temperature is 125° C. or less, occurrence of burning of the materials can be suppressed.

The kneading time for preparing the rubber composition is preferably 1 minute or more, more preferably 1.5 minutes or more, and is preferably 20 minutes or less, more preferably 15 minutes or less. If the kneading time falls within the above range, the materials can be uniformly dispersed.

In the first step, examples of the embodiment of kneading the materials include an embodiment that all the materials are kneaded at one time to prepare the rubber composition (embodiment 1); an embodiment that the components other than the component (c) are kneaded to prepare a mixture, and then the mixture and the component (c) are kneaded to prepare the rubber composition (embodiment 2); and an embodiment that the components other than the component (c) and the component (d) are kneaded to prepare a mixture, and then the mixture, the component (c) and the component (d) are kneaded to prepare the rubber composition (embodiment 3). It is noted that in the case that the one-minute half-life temperature of the component (d) is less than 160° C., the embodiment 3 is preferably adopted.

In the cases of the embodiments 2 and 3, for example, (a) the base rubber, (b) the α,β-unsaturated carboxylic acid having 3 to 8 carbon atoms and/or the metal salt thereof as the co-crosslinking agent, and the additives which are added as necessary are kneaded to prepare the mixture, and then the mixture and the component (c), or the mixture, the component (c) and the component (d) are kneaded to prepare the rubber composition. If the component (a), the component (b) and the additives are kneaded in advance, the kneading can be conducted at a higher temperature, and thus the materials can be kneaded more uniformly.

The kneading temperature for molding the mixture is preferably 95° C. or more, more preferably 100° C. or more, and is preferably 125° C. or less, more preferably 120° C. or less. If the kneading temperature is 95° C. or more, the materials can be dispersed more uniformly and thus the performance of the materials is further exerted, and if the kneading temperature is 125° C. or less, occurrence of burning of the materials can be suppressed.

The kneading time for molding the mixture is preferably 1 minute or more, more preferably 1.5 minutes or more, and is preferably 20 minutes or less, more preferably 15 minutes or less. If the kneading time falls within the above range, the materials can be uniformly dispersed.

The kneading of the mixture is preferably conducted, for example, by using a conventional kneading machine such as a roll, a kneader, and a banbury mixer. In light of improving kneading efficiency, the kneader or banbury mixer providing a great shear force is preferably used.

In the embodiments 2 and 3, the kneading temperature (T1) when molding the rubber composition is preferably 20° C. or more, more preferably 30° C. or more, and even more preferably 40° C. or more, and is preferably 110° C. or less, more preferably 100° C. or less, and even more preferably 90° C. or less. If the kneading temperature is 20° C. or more, the component (c) can be uniformly dispersed, and if the kneading temperature is 110° C. or less, the self-polymerization of the component (c) by heat can be suppressed.

In the embodiments 2 and 3, a temperature difference (Tc-T1) between the kneading temperature (T1) for preparing the rubber composition and the self-polymerization temperature (Tc) of (c) the crosslinkable compound by heat is preferably 10° C. or more, more preferably 15° C. or more, and even more preferably 20° C. or more. If the temperature difference (Tc-T1) is 10° C. or more, the self-polymerization of (c) the crosslinkable compound by heat can be suppressed even if shearing the rubber generates heat. The upper limit of the temperature difference (Tc-T1) is not particularly limited, but the upper limit is preferably about 200° C.

In the embodiment 3, a temperature difference (Td-T1) between the kneading temperature (T1) for preparing the rubber composition and the one-minute half-life temperature (Td) of (d) the crosslinking initiator is preferably 40° C. or more, more preferably 45° C. or more, and even more preferably 50° C. or more. If the temperature difference (Td-T1) is 40° C. or more, the decomposition of (d) the crosslinking initiator during the kneading for preparing the rubber composition can be suppressed. The upper limit of the temperature difference (Td-T1) is not particularly limited, but the upper limit is preferably about 140° C. It is noted that in the case that two or more of the components (d) are used as the material, all the components (d) preferably satisfy the above range.

In the embodiments 2 and 3, the kneading for preparing the rubber composition can be performed, for example, by using a conventional kneading machine such as a roll, a kneader, and a banbury mixer. In light of suppressing the heat generation during kneading the materials, the roll is preferably used.

Next, the materials will be explained. In the method for producing the golf ball according to the present invention, the rubber composition contains at least (a) the base rubber, (b) the α,β-unsaturated carboxylic acid having 3 to 8 carbon atoms and/or the metal salt thereof as the co-crosslinking agent, (c) the crosslinkable compound having two or more polymerizable unsaturated bonds in the molecule thereof, and (d) the crosslinking initiator.

(a) Base Rubber

As (a) the base rubber, a natural rubber and/or a synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely or two or more of these rubbers may be used in combination. Among them, typically preferred is a high-cis polybutadiene having a cis-1,4 bond in a proportion of 40 mass % or more, preferably 80 mass % or more, more preferably 90 mass % or more in view of its superior resilience property. The amount of the polybutadiene in (a) the base rubber is preferably 70 mass % or more, more preferably 90 mass % or more.

The high-cis polybutadiene preferably has a 1,2-vinyl bond in an amount of 2 mass % or less, more preferably 1.7 mass % or less, and even more preferably 1.5 mass % or less. If the amount of the 1,2-vinyl bond is excessively high, the resilience may be lowered.

The high-cis polybutadiene is preferably one synthesized by using a rare earth element catalyst. When a neodymium catalyst, which employs a neodymium compound of a lanthanum series rare earth element compound, is used, a polybutadiene rubber having a high amount of the cis-1,4 bond and a low amount of the 1,2-vinyl bond is obtained with excellent polymerization activity. Thus, such the polybutadiene rubber is particularly preferred.

The Mooney viscosity ($ML_{1+4}$ (100° C.)) of the high-cis polybutadiene is preferably 30 or more, more preferably 32 or more, and even more preferably 35 or more, and is preferably 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of a preheating time: 1 minute, a rotor revolution time: 4 minutes, and a temperature: 100° C.

The molecular weight distribution Mw/Mn (Mw: weight average molecular weight, Mn: number average molecular weight) of the high-cis polybutadiene is preferably 2.0 or more, more preferably 2.2 or more, even more preferably 2.4 or more, and most preferably 2.6 or more, and is preferably 6.0 or less, more preferably 5.0 or less, even more preferably 4.0 or less, and most preferably 3.4 or less. If the molecular weight distribution (Mw/Mn) of the high-cis polybutadiene is excessively low, the workability may be lowered, and if the molecular weight distribution (Mw/Mn) of the high-cis polybutadiene is excessively high, the resilience may be lowered. It is noted that the molecular weight distribution is measured by gel permeation chromatography ("HLC-8120GPC" available from Tosoh Corporation) using a differential refractometer as a detector under the conditions of a column: GMHHXL (available from Tosoh Corporation), a column temperature: 40° C., and a mobile phase: tetrahydrofuran, and is a value calculated by converting based on polystyrene standard.

(b) Co-Crosslinking Agent (b) The α,β-unsaturated carboxylic acid having 3 to 8 carbon atoms and/or the metal salt thereof is blended as the co-crosslinking agent in the rubber composition, and has an action of crosslinking a rubber molecule by graft polymerization to a base rubber molecular chain. In the case that the rubber composition contains only the α,β-unsaturated carboxylic acid having 3 to 8 carbon atoms as the co-crosslinking agent, the rubber composition preferably further contains (e) a metal compound which will be described later. Neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms as the co-crosslinking agent. It is noted that in the case of using the metal salt of the α,β-unsaturated carboxylic acid having 3 to 8 carbon atoms as the co-crosslinking agent, (e) the metal compound may be added as an optional component.

Examples of the α,β-unsaturated carboxylic acid having 3 to 8 carbon atoms include acrylic acid, methacrylic acid, fumaric acid, maleic acid, and crotonic acid.

Examples of the metal constituting the metal salt of the α,β-unsaturated carboxylic acid having 3 to 8 carbon atoms include a monovalent metal ion such as sodium, potassium, and lithium; a divalent metal ion such as magnesium, calcium, zinc, barium, and cadmium; a trivalent metal ion such as aluminum; and other metal ion such as tin and zirconium. The above metal ions can be used solely or as a mixture of at least two of them. Among these metal ions, the divalent metal ion such as magnesium, calcium, zinc, barium, and cadmium are preferably used. Use of the divalent metal salt of the α,β-unsaturated carboxylic acid having 3 to 8 carbon atoms easily generates a metal crosslinking between the rubber molecules. Especially, as the divalent metal salt, zinc acrylate is preferable, because the zinc acrylate enhances the resilience of the resultant golf ball. It is noted that the α,β-unsaturated carboxylic acid having 3 to 8 carbon atoms and/or the metal salt thereof may be used solely, or at least two of them may be used in combination.

The amount of (b) the α,β-unsaturated carboxylic acid having 3 to 8 carbon atoms and/or the metal salt thereof is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less, with respect to 100 parts by mass of (a) the base rubber. If the amount of (b) the α,β-unsaturated carboxylic acid having 3 to 8 carbon atoms and/or the metal salt thereof is less than 15 parts by mass, the amount of (d) the crosslinking initiator which will be explained below must be increased in order to obtain an appropriate hardness of the constituting member formed from the rubber composition, which tends to cause the lower resilience of the golf ball. On the other hand, if the amount of (b) the hα,β-unsaturated carboxylic acid having 3 to 8 carbon atoms and/or the metal salt thereof exceeds 50 parts by mass, the constituting member formed from the rubber composition becomes excessively hard, which tends to cause the lower shot feeling of the golf ball.

(c) Crosslinkable Compound Having Two or More Polymerizable Unsaturated Bonds in the Molecule Thereof Examples of the polymerizable unsaturated bond of (c) the crosslinkable compound include a carbon-carbon double bond and a carbon-carbon triple bond, and the carbon-carbon double bond is preferable. The number of the polymerizable unsaturated bonds in the molecule of (c) the crosslinkable compound is 2 or more, and is preferably 6 or less, more preferably 4 or less. (c) The crosslinkable compound may be used solely, or two or more of them may be used in combination. It is noted that (c) the crosslinkable compound excludes the α,β-unsaturated carboxylic acid having 3 to 8 carbon atoms and the metal salt thereof used as (b) the co-crosslinking agent.

The molecular weight of (c) the crosslinkable compound is preferably 100 or more, more preferably 130 or more, and even more preferably 150 or more, and is preferably 500 or less, more preferably 450 or less, and even more preferably 400 or less.

As (c) the crosslinkable compound, a crosslinkable compound having two or more vinyl groups in the molecule thereof is preferable, and a crosslinkable compound having two or more (meth)acryloyl groups in the molecule thereof is more preferable. It is noted that "(meth)acryloyl group" means "acryloyl group and/or methacryloyl group".

Examples of the crosslinkable compound having two or more vinyl groups in the molecule thereof include divinyl benzene, trivinyl benzene, divinyl naphthalene, trivinyl naphthalene, divinyl anthracene, trivinyl anthracene, divinyl cyclohexane, and trivinyl cyclohexane.

Examples of the crosslinkable compound having two or more (meth)acryloyl groups in the molecule thereof include an ester formed from a dihydric to hexahydric alcohol and (meth)acrylic acid. It is noted that "(meth)acrylic acid" means "acrylic acid and/or methacrylic acid". Examples of the dihydric to hexahydric alcohol include an alkane polyol having 2 to 20 carbon atoms, and an alkane diol having 2 to 20 carbon atoms and an alkane triol having 2 to 20 carbon atoms are preferable.

Examples of the crosslinkable compound having two or more (meth)acryloyl groups in the molecule thereof include a crosslinkable compound having two (meth)acryloyl groups in the molecule thereof, such as ethylene glycol di(meth)acrylate, propanediol di(meth)acrylate, butanediol di(meth)acrylate, pentanediol di(meth)acrylate, hexanediol di(meth)acrylate, heptanediol di(meth)acrylate, and octanediol di(meth)acrylate; and a crosslinkable compound having three (meth)acryloyl groups in the molecule thereof, such as trimethylolpropane tri(meth)acrylate, and pentaerythritol tri(meth)acrylate. Among them, as (c) the crosslinkable compound, at least one member selected from the group consisting of trimethylolpropane tri(meth)acrylate, ethylene glycol di(meth)acrylate, and 1,6-hexanediol di(meth)acrylate is preferable.

The self-polymerization temperature (Tc) of (c) the crosslinkable compound by heat is preferably 120° C. or more, more preferably 130° C. or more, and even more preferably 140° C. or more. If the self-polymerization temperature (Tc) of (c) the crosslinkable compound by heat is 120° C. or more, the self-polymerization of (c) the crosslinkable compound by heat when press molding the core can be suppressed, and thus the three-dimensional crosslinked structure is easily formed inside the obtained spherical core. It is noted that the upper limit of the temperature of the self-polymerization of (c) the crosslinkable compound by heat is not particularly limited, but the upper limit temperature is preferably about 300° C.

The amount of (c) the crosslinkable compound is preferably 2 parts by mass or more, more preferably 3 parts by mass or more, and even more preferably 5 parts by mass or more, and is preferably 39 parts by mass or less, more preferably 30 parts by mass or less, and even more preferably 20 parts by mass or less, with respect to 100 parts by mass of (a) the base rubber. If the amount of (c) the crosslinkable compound is 2 parts by mass or more, the durability improvement effect of the golf ball is enhanced, and if the amount of (c) the crosslinkable compound is 39 parts by mass or less, lowering in the resilience performance of the golf ball is further reduced.

(d) Crosslinking Initiator (d) The crosslinking initiator is blended in order to crosslink (a) the base rubber component. As (d) the crosslinking initiator, an organic peroxide is preferable. Specific examples of the organic peroxide include a dialkyl peroxide, a peroxy ester, a peroxy ketal and a hydroperoxide. Examples of the dialkyl peroxide include di(2-t-butylperoxy isopropyl) benzene (175.4° C.), dicumyl peroxide (175.2° C.), 2,5-dimethyl-2,5-di(t-butylperoxy) hexane (179.8° C.), t-butylcumylperoxy (173.3° C.), di-t-hexylperoxy (176.7° C.), di-t-butylperoxy (185.9° C.), and 2,5-dimethyl-2,5-di(t-butylperoxy) hexyne-3 (194.3° C.). Examples of the peroxy ester include t-butylperoxy maleate (167.5° C.), t-butylperoxy-3,3,5-trimethyl cyclohexanoate (166.0° C.), t-butylperoxy laurate (159.4° C.), t-butylperoxy isopropyl monocarbonate (158.8° C.), t-hexylperoxy benzoate (160.3° C.), 2,5-dimethyl-2,5-di(benzoylperoxy) hexane (158.2° C.), t-butylperoxy acetate (159.9° C.), and t-butylperoxy benzoate (166.8° C.). Examples of the peroxy ketal include 1,1-di(t-hexylperoxy)-3,3,5-trimethyl cyclohexane (147.1° C.), 1,1-di(t-hexylperoxy) cyclohexane (149.2° C.), 1,1-di(t-butylperoxy)-2-methyl cyclohexane (142.1° C.), 1,1-di(t-butylperoxy) cyclohexane (153.8° C.), 2,2-di(t-butylperoxy) butane (159.9° C.), n-butyl-4,4-di(t-butylperoxy) valerate (172.5° C.), and 2,2-di(4,4-di(t-butylperoxy) cyclohexyl) propane (153.8° C.). Examples of the hydroperoxide include p-menthane hydroperoxide (199.5° C.), and diisopropylbenzene hydroperoxide (232.5° C.). The numerical value described in the parenthesis after the compound name of the organic peroxide is a one-minute half-life temperature of the organic peroxide. These organic peroxides may be used solely, or at least two of them may be used in combination. It is noted that in the case of using two or more of the organic peroxides in combination, a difference between the maximum value and the minimum value of the one-minute half-life temperature of the used organic peroxides is preferably 25° C. or less, more preferably 10° C. or less.

The one-minute half-life temperature (Td) of (d) the crosslinking initiator is preferably less than 160° C., more preferably 158° C. or less, and even more preferably 155° C. or less. If the one-minute half-life temperature of (d) the crosslinking initiator is less than 160° C., the molding temperature of the spherical core can be set low, the deterioration of the base rubber can be suppressed. The one-minute half-life temperature of (d) the crosslinking initiator is preferably 100° C. or more, more preferably 105° C. or more, and even more preferably 110° C. or more. If the one-minute half-life temperature of (d) the crosslinking initiator is 100° C. or more, the decomposition of (d) the crosslinking initiator for preparing the rubber composition can be suppressed.

The amount of (d) the crosslinking initiator is preferably 0.1 part by mass or more, more preferably 0.5 part by mass or more, and even more preferably 0.7 part by mass or more, and is preferably 5.0 parts by mass or less, more preferably 2.5 parts by mass or less, and even more preferably 2.0 parts by mass or less, with respect to 100 parts by mass of (a) the base rubber. If the amount of (d) the crosslinking initiator is less than 0.1 part by mass, the constituting member formed from the rubber composition is so soft that the golf ball tends to have lowered resilience, and if the amount of (d) the crosslinking initiator exceeds 5.0 parts by mass, the amount of (b) the co-crosslinking agent which has been explained above must be decreased in order to obtain an appropriate hardness of the constituting member formed from the rubber composition, which tends to cause the lower resilience of the golf ball or the worsen durability of the golf ball.

(e) Metal Compound

In the case that the core rubber composition contains only the $\alpha,\beta$-unsaturated carboxylic acid having 3 to 8 carbon atoms as the co-crosslinking agent, the core rubber composition preferably further contains (e) a metal compound. (e) The metal compound is not particularly limited as long as it can neutralize (b) the $\alpha,\beta$-unsaturated carboxylic acid having 3 to 8 carbon atoms in the rubber composition. Examples of (e) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. (e) The metal compound is preferably the divalent metal compound, more preferably the zinc compound. The divalent metal compound reacts with the $\alpha,\beta$-unsaturated carboxylic acid having 3 to 8 carbon atoms, thereby forming a metal crosslinking. Use of the zinc compound provides a golf ball with high resilience. (e) The metal compound may be used solely, or at least two of them may be used in combination. The amount of (e) the metal compound can be appropriately adjusted according to the desired neutralization degree of (b) the $\alpha,\beta$-unsaturated carboxylic acid having 3 to 8 carbon atoms.

(f) Organic Sulfur Compound

The core rubber composition may further contain (f) an organic sulfur compound. If the rubber composition contains (f) the organic sulfur compound, the spherical core has further enhanced resilience. (f) The organic sulfur compound may be used solely, or a mixture of at least two of them may be used.

(f) The organic sulfur compound is not particularly limited, as long as it is an organic compound having a sulfur atom in the molecule thereof. Examples thereof include an organic compound having a thiol group (—SH) or a polysulfide bond having 2 to 4 sulfur atoms (—S—S—, —S—

—S—S—, or —S—S—S—S—), and a metal salt thereof (—SM, —S-M-S—, —S-M-S—S—, —S—S-M-S—S—, —S-M-S—S—S—, or the like; M is a metal atom). Examples of the metal salt include a monovalent metal salt such as sodium, lithium, potassium, copper (I), and silver (I), and a divalent metal salt such as zinc, magnesium, calcium, strontium, barium, titanium (II), manganese (II), iron (II), cobalt (II), nickel(II), zirconium(II), and tin (II). Furthermore, (f) the organic sulfur compound may be any one of an aliphatic compound (aliphatic thiol, aliphatic thiocarboxylic acid, aliphatic dithiocarboxylic acid, aliphatic polysulfide, or the like), a heterocyclic compound, an alicyclic compound (alicyclic thiol, alicyclic thiocarboxylic acid, alicyclic dithiocarboxylic acid, alicyclic polysulfide, or the like), and an aromatic compound.

Examples of (f) the organic sulfur compound include thiols (thiophenols and thionaphthols), polysulfides, thiurams, thiocarboxylic acids, dithiocarboxylic acids, sulfenamides, dithiocarbamates, and thiazoles.

Examples of the thiols include thiophenols and thionaphthols. Examples of the thiophenols include thiophenol; thiophenols substituted with a fluoro group, such as 4-fluorothiophenol, 2,5-difluorothiophenol, 2,6-difluorothiophenol, 2,4,5-trifluorothiophenol, 2,4,5,6-tetrafluorothiophenol, and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, and pentachlorothiophenol; thiophenols substituted with a bromo group, such as 4-bromothiophenol, 2,5-dibromothiophenol, 2,6-dibromothiophenol, 2,4,5-tribromothiophenol, 2,4,5,6-tetrabromothiophenol, and pentabromothiophenol; thiophenols substituted with an iodo group, such as 4-iodothiophenol, 2,5-diiodothiophenol, 2,6-diiodothiophenol, 2,4,5-triiodothiophenol, 2,4,5,6-tetraiodothiophenol, and pentaiodothiophenol; and metal salts thereof. As the metal salt, a zinc salt is preferable.

Examples of the thionaphthols (naphthalene thiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and metal salts thereof, and 2-thionaphthol, 1-thionaphthol, or the metal salt thereof is preferable. As the metal salt, a divalent metal salt is preferable, a zinc salt is more preferable. Specific examples of the metal salt include zinc salt of 1-thionaphthol, and zinc salt of 2-thionaphthol.

The polysulfides are organic sulfur compounds having a polysulfide bond, and examples thereof include disulfides, trisulfides, and tetrasulfides. As the polysulfides, diphenylpolysulfides are preferable.

Examples of the diphenyl polysulfides include diphenyl disulfide; diphenyl disulfides substituted with a halogen group, such as bis(4-fluorophenyl) disulfide, bis(2,5-difluorophenyl) disulfide, bis(2,6-difluorophenyl) disulfide, bis(2,4,5-trifluorophenyl) disulfide, bis(2,4,5,6-tetrafluorophenyl) disulfide, bis(pentafluorophenyl) disulfide, bis(4-chlorophenyl) disulfide, bis(2,5-dichlorophenyl) disulfide, bis(2,6-dichlorophenyl) disulfide, bis(2,4,5-trichlorophenyl) disulfide, bis(2,4,5,6-tetrachlorophenyl) disulfide, bis(pentachlorophenyl) disulfide, bis(4-bromophenyl) disulfide, bis(2,5-dibromophenyl) disulfide, bis(2,6-dibromophenyl) disulfide, bis(2,4,5-tribromophenyl) disulfide, bis(2,4,5,6-tetrabromophenyl) disulfide, bis(pentabromophenyl) disulfide, bis(4-iodophenyl) disulfide, bis(2,5-diiodophenyl) disulfide, bis(2,6-diiodophenyl) disulfide, bis(2,4,5-triiodophenyl) disulfide, bis(2,4,5,6-tetraiodophenyl) disulfide, and bis(pentaiodophenyl) disulfide; and diphenyl disulfides substituted with an alkyl group, such as bis(4-methylphenyl) disulfide, bis (2,4,5-trimethylphenyl) disulfide, bis(pentamethylphenyl) disulfide, bis(4-t-butylphenyl) disulfide, bis(2,4,5-tri-t-butylphenyl) disulfide, and bis(penta-t-butylphenyl) disulfide.

Examples of the thiurams include thiuram monosulfides such as tetramethylthiuram monosulfide, thiuram disulfides such as tetramethylthiuram disulfide, tetraethylthiuram disulfide, and tetrabutylthiuram disulfide, and thiuram tetrasulfides such as dipentamethylenethiuram tetrasulfide. Examples of the thiocarboxylic acids include naphthalene thiocarboxylic acid. Examples of the dithiocarboxylic acids include naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

As (f) the organic sulfur compound, the thiophenols and/or the metal salt thereof, the thionaphthols and/or the metal salt thereof, the diphenyl disulfides, and the thiuram disulfides are preferable, 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl) disulfide, bis(2,6-dichlorophenyl) disulfide, bis(2,6-dibromophenyl) disulfide, bis(2,6-diiodophenyl) disulfide, and bis(pentabromophenyl) disulfide are more preferable.

The amount of (f) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the amount of (f) the organic sulfur compound is less than 0.05 part by mass, the effect of adding (f) the organic sulfur compound may not be obtained and thus the resilience of the golf ball may not be enhanced. In addition, if the amount of (f) the organic sulfur compound exceeds 5.0 parts by mass, the obtained golf ball has a large compression deformation amount, and thus the resilience thereof may be lowered.

(g) Carboxylic Acid and/or Metal Salt Thereof

The core rubber composition may further contain (g) a carboxylic acid and/or a metal salt thereof. It is noted that (g) the carboxylic acid and/or the salt thereof excludes the α,β-unsaturated carboxylic acid having 3 to 8 carbon atoms and the metal salt thereof used as (b) the co-crosslinking agent. Examples of (g) the carboxylic acid and/or the salt thereof include a saturated fatty acid, a metal salt of a saturated fatty acid, an aromatic carboxylic acid, and a metal salt of an aromatic carboxylic acid. (g) The carboxylic acid and/or the metal salt thereof may be used solely, or a mixture of at least two of them may be used.

Examples of the saturated fatty acid include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, and triacontanoic acid.

Examples of the aromatic carboxylic acid include benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalene carboxylic acid, and anthracene carboxylic acid.

Examples of the cation component of (g) the metal salt of the carboxylic acid include a monovalent metal ion such as sodium, potassium, lithium, and silver; a bivalent metal ion such as magnesium, calcium, zinc, barium, cadmium, copper, cobalt, nickel, and manganese; a trivalent metal ion such as aluminum, and iron; and other ion such as tin, zirconium, and titanium. As (g) the metal salt of the carboxylic acid, a zinc salt of a carboxylic acid is preferable. These cation components may be used solely, or a mixture of at least two of them may be used.

The core rubber composition may contain additives such as a pigment, a filler for adjusting weight or the like, an antioxidant, a peptizing agent, and a softener, where necessary. In addition, the core rubber composition may contain a rubber powder obtained by pulverizing a golf ball core or offcuts produced when preparing a core.

Examples of the pigment blended in the rubber composition include a white pigment, a blue pigment, and a purple pigment. As the white pigment, titanium oxide is preferably used. The type of titanium oxide is not particularly limited, but rutile type is preferably used because of its high opacity. The amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The filler blended in the rubber composition is used as a weight adjusting agent for mainly adjusting the weight of the golf ball obtained as a final product. The filler may be blended where necessary. Examples of the filler include an inorganic filler such as barium sulfate, calcium carbonate, magnesium oxide, tungsten powder, and molybdenum powder.

The amount of the antioxidant is preferably 0.1 part by mass or more and 1 part by mass or less with respect to 100 parts by mass of (a) the base rubber. In addition, the amount of the peptizing agent is preferably 0.1 part by mass or more and 5 parts by mass or less with respect to 100 parts by mass of (a) the base rubber.

(2) Second Step

In the second step, the spherical core is molded from the above core rubber composition. The core rubber composition obtained by kneading is extruded into a rod-like shape with an extruder, and cut into a predetermined length to prepare a preform (also called "plug"). In the case of using the extruder to prepare the plug, the rubber composition can be heated when being kneading, but the heating temperature is preferably 75° C. or less. In addition, the core rubber composition may be molded into a sheet shape having a thickness, and the sheet is punched to prepare the plug. The size of the plug may be appropriately varied depending on the size of the mold for compression molding. The obtained plug is preferably, for example, dipped into an anti-adhering agent liquid such that the plug does not adhere to each other, dried, and then aged for about 8 to 48 hours.

Next, the plug is charged into the mold for core molding, and press molded. In the production method according to the present invention, in the step of heat pressing the rubber composition to mold the spherical core, the molding temperature (T2) is set in a range from 100° C. to 150° C. If the heat pressing temperature falls within the above range, the self-polymerization of (c) the crosslinkable compound by heat can be suppressed. The molding temperature is preferably 110° C. or more, more preferably 120° C. or more, and is preferably 145° C. or less, more preferably 140° C. or less. It is noted that in the present invention, the pressing temperature is a setting temperature of the press molding machine.

The temperature difference (Tc-T2) between the molding temperature (T2) and the self-polymerization temperature (Tc) of (c) the crosslinkable compound by heat is preferably 1° C. or more, more preferably 5° C. or more, and even more preferably 10° C. or more. If the temperature difference (Tc-T2) is 1° C. or more, the self-polymerization of (c) the crosslinkable compound by heat is suppressed. The upper limit of the temperature difference (Tc-T2) is not particularly limited, but it is preferably about 200° C. It is noted that in the case that two or more of the components (c) are used as the material, all the components (c) preferably satisfy the above range.

The temperature difference (Td-T2) between the molding temperature (T2) and the one-minute half-life temperature (Td) of (d) the crosslinking initiator is preferably 40° C. or less, more preferably 35° C. or less, and even more preferably 30° C. or less. If the temperature difference (Td-T2) is 40° C. or less, (d) the crosslinking initiator can sufficiently decompose at the molding temperature, and thus the obtained spherical core has a greater degree of an outer-hard inner-soft structure. In addition, the temperature difference (Td-T2) is preferably 0° C. or more, more preferably 5° C. or more, and even more preferably 10° C. or more. If the temperature difference (Td-T2) is 0° C. or more, the reaction can be controlled. It is noted that in the case that two or more of the components (d) are used as the material, all the components (d) preferably satisfy the above range.

The molding time is preferably 10 minutes or more, more preferably 12 minutes or more, and even more preferably 15 minutes or more, and is preferably 60 minutes or less, more preferably 50 minutes or less, and even more preferably 45 minutes or less. In addition, the molding pressure preferably ranges from 2.9 MPa to 11.8 MPa.

The spherical core produced in the second step preferably has the following diameter, compression deformation amount and hardness.

The diameter of the spherical core is preferably 34.8 mm or more, more preferably 36.8 mm or more, and even more preferably 38.8 mm or more, and is preferably 42.2 mm or less, more preferably 41.8 mm or less, even more preferably 41.2 mm or less, and most preferably 40.8 mm or less. If the diameter of the spherical core is 34.8 mm or more, the cover is not excessively thick, and thus the resilience is better. On the other hand, if the diameter of the spherical core is 42.2 mm or less, the cover is not excessively thin, and thus the cover functions better.

When the spherical core has a diameter in the range from 34.8 mm to 42.2 mm, the compression deformation amount of the spherical core (shrinking amount of the spherical core along the compression direction) when applying a load from 98 N as an initial load to 1275 N as a final load to the spherical core is preferably 1.90 mm or more, more preferably 2.00 mm or more, and even more preferably 2.10 mm or more, and is preferably 5.00 mm or less, more preferably 4.80 mm or less, and even more preferably 4.60 mm or less. If the compression deformation amount is 1.90 mm or more, the shot feeling is better, and if the compression deformation amount is 5.00 mm or less, the resilience is better.

The hardness difference (Hs-Ho) of the spherical core between the surface hardness Hs and the center hardness Ho thereof is preferably 10 or more, more preferably 18 or more, and even more preferably 20 or more, and is preferably 50 or less, more preferably 48 or less, and even more preferably 45 or less in Shore D hardness. If the hardness difference between the core surface and the core center is great, the obtained golf ball has a high launch angle and a low spin rate, thereby traveling a great flight distance.

The center hardness Ho of the spherical core is preferably 40 or more, more preferably 45 or more, and even more preferably 50 or more in Shore D hardness. If the center hardness Ho of the spherical core is less than 40 in Shore D hardness, the spherical core is so soft that the resilience thereof may be lowered. In addition, the center hardness Ho of the spherical core is preferably 65 or less, more preferably 63 or less, and even more preferably 60 or less in Shore D hardness. If the center hardness Ho of the spherical core exceeds 65 in Shore D hardness, the spherical core is so hard that the shot feeling thereof may be lowered.

The surface hardness Hs of the spherical core is preferably 70 or more, more preferably 75 or more, and is preferably 90 or less, more preferably 85 or less in Shore D hardness. If the surface hardness of the spherical core is 70 or more in Shore D hardness, the spherical core is not excessively soft and thus better resilience is obtained. In addition, if the surface hardness of the spherical core is 90 or less in Shore D hardness, the spherical core is not excessively hard and thus better shot feeling is obtained.

(3) Third Step

In the third step, at least one cover layer covering the spherical core is molded on the spherical core. Examples of the method for molding the cover include a method of molding the cover composition containing a resin component into hollow shells, covering the core with a plurality of the hollow shells and performing compression molding (preferably a method of molding the cover composition into hollow half shells, covering the core with two of the hollow half shells, and performing compression molding); and a method of injection molding the cover composition containing a resin component directly onto the core.

Examples of the resin component contained in the cover composition include an ionomer rein; a thermoplastic polyurethane elastomer having a trade name of "Elastollan (registered trademark)" available from BASF Japan Ltd; a thermoplastic polyamide elastomer having a trade name of "Pebax (registered trademark)" available from Arkema K. K.; a thermoplastic polyester elastomer having a trade name of "Hytrel (registered trademark)" available from Du Pont-Toray Co., Ltd.; and a thermoplastic styrene elastomer having a trade name of "Rabalon (registered trademark)" available from Mitsubishi Chemical Corporation.

Examples of the ionomer resin include a product prepared by neutralizing at least a part of carboxyl groups in a binary copolymer composed of an olefin and an α,β-unsaturated carboxylic acid having 3 to 8 carbon atoms with a metal ion, a product prepared by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion, or a mixture of those. The olefin is preferably an olefin having 2 to 8 carbon atoms. Examples of the olefin include ethylene, propylene, butene, pentene, hexene, heptene, and octene. In particular, ethylene is preferable. Examples of the α,β-unsaturated carboxylic acid having 3 to 8 carbon atoms include acrylic acid, methacrylic acid, fumaric acid, maleic acid and crotonic acid. In particular, acrylic acid and methacrylic acid are preferable. Examples of the α,β-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferable. Among these, the ionomer resin is preferably a metal ion-neutralized product of a binary copolymer composed of ethylene and (meth)acrylic acid, and a metal ion-neutralized product of a ternary copolymer composed of ethylene, (meth)acrylic acid and (meth)acrylic acid ester.

Specific examples of the ionomer resin include trade name "Himilan (registered trademark) (e.g. a binary copolymerized ionomer resin such as Himilan 1555 (Na), Himilan 1557 (Zn), Himilan 1605 (Na), Himilan 1706 (Zn), Himilan 1707 (Na), and Himilan AM3711 (Mg); and a ternary copolymerized ionomer resin such as Himilan 1856 (Na), and Himilan 1855 (Zn))" available from Du Pont-Mitsui Polychemicals Co., Ltd.

Further, examples of the ionomer resin include "Surlyn (registered trademark) (e.g. a binary copolymerized ionomer resin such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), and Surlyn AD8546 (Li); and a ternary copolymerized ionomer resin such as Surlyn 8120 (Na), Surlyn 8320 (Na), Surlyn 9320 (Zn), Surlyn 6320 (Mg), HPF 1000 (Mg), and HPF 2000 (Mg))" available from E.I. du Pont de Nemours and Company.

Further, examples of the ionomer resin include "Iotek (registered trademark) (e.g. a binary copolymerized ionomer resin such as Iotek 8000 (Na), Iotek 8030 (Na), Iotek 7010 (Zn), and Iotek 7030 (Zn); and a ternary copolymerized ionomer resin such as Iotek 7510 (Zn), and Iotek 7520 (Zn))" available from ExxonMobil Chemical Corporation.

It is noted that Na, Zn, Li, Mg, or the like described in the parenthesis after the trade name of the ionomer resin indicates a metal type of the neutralizing metal ion for the ionomer resin. The ionomer resin may be used solely, or a mixture of at least two of them may be used.

The cover composition constituting the cover of the golf ball according to the present invention preferably contains the thermoplastic polyurethane elastomer or the ionomer resin as a resin component. When the ionomer resin is used, the thermoplastic styrene elastomer is also preferably used in combination. The amount of the polyurethane or ionomer resin in the resin component of the cover composition is preferably 50 mass % or more, more preferably 60 mass % or more, and even more preferably 70 mass % or more.

The cover composition may further contain a pigment component such as a white pigment (e.g. titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or fluorescent brightener; and the like, in addition to the above resin component, as long as they do not impair the function of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the cover. In addition, if the amount of the white pigment exceeds 10 parts by mass, the durability of the obtained cover may deteriorate.

Examples of the method for molding the cover include a method of molding the cover composition into hollow shells, covering the core with a plurality of the hollow shells and performing compression molding (preferably a method of molding the cover composition into hollow half shells, covering the core with two of the hollow half shells, and performing compression molding); and a method of injection molding the cover composition directly onto the core.

When molding the cover by the compression molding method, half shells can be molded by either a compression molding method or an injection molding method, and the compression molding method is preferred. The conditions for compression molding the cover composition into half shells can be, for example, a pressure of 1 MPa or more and 20 MPa or less, and a molding temperature of −20° C. or more and 70° C. or less relative to the flow beginning temperature of the cover composition. If the above molding conditions are adopted, the half shells having a uniform thickness can be formed. Examples of the method of using the half shells to mold the cover include a method of covering the core with two of the half shells and performing compression molding. The conditions for compression molding the half shells into the cover can be, for example, a molding pressure of 0.5 MPa or more and 25 MPa or less, and a molding temperature of −20° C. or more and 70° C. or less relative to the flow beginning temperature of the cover composition. If the above molding conditions are adopted, the cover having a uniform thickness can be formed.

When molding the cover by injection molding the cover composition, the cover composition extruded in a pellet form may be used for the injection molding, or alternatively, the cover materials such as the base resin component, the pigment, or the like may be dry blended, followed by directly injection molding the blended material. It is preferred to use upper and lower molds for cover molding, each having a hemispherical cavity and pimples, wherein a part of the pimples also serves as a retractable hold pin. When molding the cover by the injection molding method, the hold pin is protruded to hold the core charged into the mold, and the cover composition is charged and cooled to mold the cover. For example, the cover composition heated to 200° C. to 250° C. is charged for 0.5 to 5 seconds into a mold held under a pressure of 9 MPa to 15 MPa, and cooled for 10 to 60 seconds, and the mold is opened to eject the golf ball.

The concave portions called "dimples" are usually formed on the surface of the cover when molding the cover. The total number of the dimples formed on the cover is preferably 200 or more and 500 or less. If the total number of the dimples is less than 200, the dimple effect is hardly obtained. In addition, if the total number of the dimples exceeds 500, the dimple effect is hardly obtained because the size of the respective dimples is small. The shape (shape in a plan view) of the dimples includes, for example, without limitation, a circle; a polygonal shape such as a roughly triangular shape, a roughly quadrangular shape, a roughly pentagonal shape, a roughly hexagonal shape; and other irregular shape. The shape of the dimples may be employed solely or at least two of them may be used in combination.

The thickness of the cover is preferably 4.0 mm or less, more preferably 3.0 mm or less, and even more preferably 2.0 mm or less. If the thickness of the cover is 4.0 mm or less, the obtained golf ball has better resilience and shot feeling. The thickness of the cover is preferably 0.3 mm or more, more preferably 0.5 mm or more, even more preferably 0.8 mm or more, and most preferably 1.0 mm or more. If the thickness of the cover is less than 0.3 mm, the durability and wear resistance of the cover may deteriorate. If the cover has a plurality of layers, it is preferred that the total thickness of the cover layers falls within the above range.

The golf ball body with the cover formed thereon is ejected from the mold, and as necessary, the golf ball body is preferably subjected to surface treatments such as deburring, cleaning, and sandblast. In addition, if desired, a paint film or a mark may be formed thereon. The thickness of the paint film is not particularly limited, but the thickness is preferably 5 µm or more, more preferably 7 µm or more, and is preferably 50 µm or less, more preferably 40 µm or less, and even more preferably 30 µm or less. If the thickness of the paint film is less than 5 µm, the paint film is easy to wear off due to the continued use of the golf ball, and if the thickness of the paint film exceeds 50 µm, the effect of the dimples is reduced, and thus the flight performance of the golf ball may be lowered.

[Golf Ball]

The construction of the golf ball produced by the production method according to the present invention is not particularly limited, as long as the golf ball comprises a spherical core, and at least one cover layer covering the spherical core. The spherical core preferably has a single layered structure. Unlike the multi-layered structure, the single layered spherical core does not have an energy loss at the interface of the multi-layered structure when hitting, and thus has an enhanced resilience. In addition, the cover has a structure composed of at least one layer, and may be, for example, a single layered structure, or a multi-layered structure composed of at least two layers. Examples of the golf ball include a two-piece golf ball composed of a spherical core and a single layered cover disposed around the spherical core; a multi-piece golf ball (including a three-piece golf ball) composed of a spherical core, and at least two cover layers disposed around the spherical core; and a wound golf ball composed of a spherical core, a rubber thread layer disposed around the spherical core, and a cover disposed around the rubber thread layer. The present invention can be suitably applied to any one of the above golf balls.

The golf ball preferably has a diameter ranging from 40 mm to 45 mm. In light of satisfying a regulation of US Golf Association (USGA), the diameter is particularly preferably 42.67 mm or more. In light of prevention of the air resistance, the diameter is more preferably 44 mm or less, particularly preferably 42.80 mm or less. The golf ball preferably has a mass of 40 g or more and 50 g or less. In light of obtaining greater inertia, the golf ball more preferably has a mass of 44 g or more, particularly preferably 45.00 g or more. In light of satisfying a regulation of USGA, the golf ball particularly preferably has a mass of 45.93 g or less.

When the golf ball has a diameter in the range of from 40 mm to 45 mm, the compression deformation amount of the golf ball (shrinking amount of the golf ball along the compression direction) when applying a load from an initial load of 98 N to a final load of 1275 N to the golf ball is preferably 2.0 mm or more, more preferably 2.2 mm or more, and even more preferably 2.4 mm or more, and is preferably 4.0 mm or less, more preferably 3.5 mm or less, and even more preferably 3.4 mm or less. If the compression deformation amount is 2.0 mm or more, the golf ball does not become excessively hard, and thus the shot feeling thereof is better. On the other hand, if the compression deformation amount is 4.0 mm or less, the resilience is enhanced.

The golf ball according to the present invention is produced by the above-described production method. In other words, the golf ball according to the present invention comprises a spherical core and at least one cover layer covering the spherical core, wherein the spherical core is produced by heat pressing a rubber composition containing (a) a base rubber, (b) an α,β-unsaturated carboxylic acid having 3 to 8 carbon atoms and/or a metal salt thereof as a co-crosslinking agent, (c) a crosslinkable compound having two or more polymerizable unsaturated bonds in a molecule thereof, and (d) a crosslinking initiator, wherein the heat pressing temperature ranges from 100° C. to 150° C.

Figure 1:
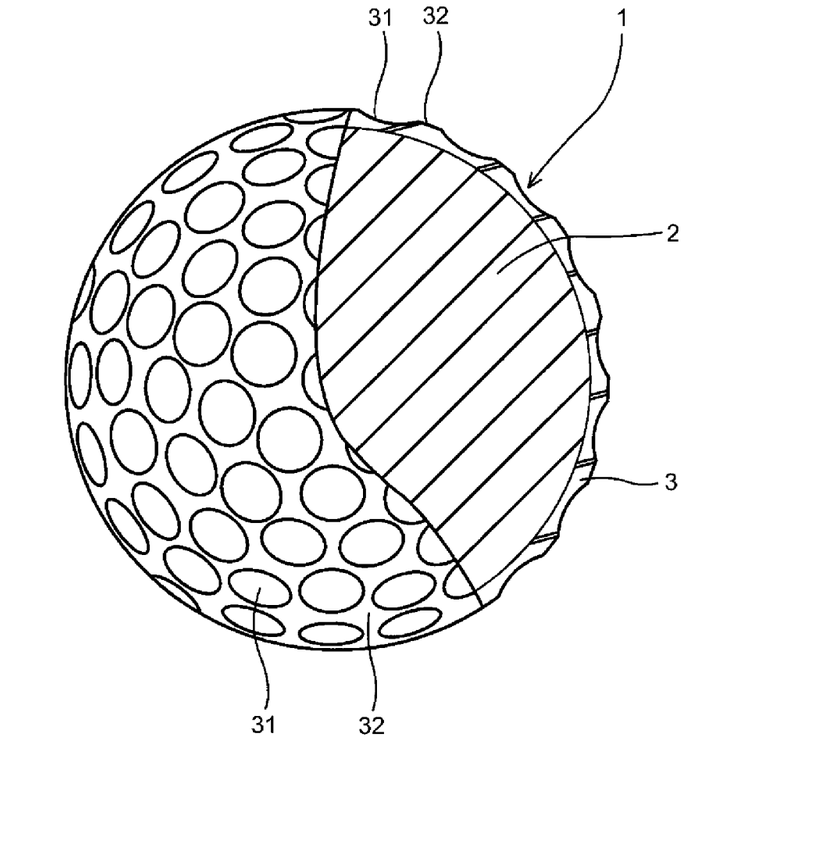
FIG. 1 is a partially cutaway cross-sectional view showing a golf ball of one embodiment of the present invention.

FIG. 1 is a partially cutaway cross-sectional view showing a golf ball 1 according to one embodiment of the present invention. The golf ball 1 comprises a spherical core 2, and a cover 3 covering the spherical core 2. On the surface of the cover, a plurality of dimples 31 are formed. On the surface of the golf ball 1, a part other than the dimples 31 is a land 32. The golf ball 1 further comprises a paint layer and a mark layer on the outer side of the cover 3, but these layers are not depicted.

EXAMPLES

Hereinafter, the present invention will be described in detail by way of examples. However, the present invention is not limited to the examples described below, and various changes and modifications without departing from the gist of the present invention are included in the scope of the present invention.

[Evaluation Method]
(1) Polymerization Temperature of (c) Crosslinkable Compound by Heat The polymerization temperature of (c) the crosslinkable compound by heat was measured with a differential scanning calorimeter (DSC). The measuring conditions were a temperature rising rate of 10° C./min and a measuring temperature range of from −10° C. to 250° C. The temperature at the peak top of the obtained DSC curve was determined and adopted as the polymerization temperature by heat.

(2) Core Hardness (Shore D Hardness)

The hardness measured at the surface of the core was adopted as the surface hardness of the core. In addition, the core was cut into two hemispheres to obtain a cut plane, and the hardness measured at the central point of the cut plane was adopted as the center hardness of the core. The hardness was measured with an automatic hardness tester (Digitest II, available from Bareiss company) using a detector of "Shore ID".

(3) Compression Deformation Amount (Mm)

The deformation amount of the core or golf ball along the compression direction (shrinking amount of the core or golf ball along the compression direction), when applying a load from 98 N as an initial load to 1275 N as a final load to the core or golf ball, was measured.

(4) Flight Distance on Driver Shots

A W#1 driver provided with a metal head (XXIO S, Loft angel: 11°, available from Dunlop Sports Co. Limited) was installed on a swing robot M/C available from Golf Laboratories, Inc. The golf ball was hit at a head speed of 40 m/sec, and the flight distance (the distance from the launch point to the stop point) of the golf ball was measured. It is noted that the measurement was conducted twelve times for each golf ball, and the average value thereof was adopted as the measurement value for the golf ball. It is noted that flight distance of each golf ball is shown as a difference from the flight distance of the golf ball No. 7 (flight distance difference=flight distance of each golf ball−flight distance of golf ball No. 7).

(5) Durability

An air gun was used to allow twelve samples for each golf ball to collide with a metal plate repeatedly at a speed of 45 m/sec until the golf ball was broken, and the repeated number was counted. It is noted that the durability of the golf ball No. 16 was defined as 100, and the durability of each golf ball was represented by converting the durability of each golf ball into this index.

[Production of Golf Ball]
(1) Preparation of Core Rubber Composition

The materials shown in Tables 1 and 2 were kneaded with a kneader to prepare a mixture. Then, the obtained mixture, the component (c) and the component (d) were kneaded with a kneading roll according to the formulations shown in Tables 1 and 2, to prepare the core rubber compositions. It is noted that an appropriate amount of barium sulfate was added such that the obtained golf ball had a mass of 45.4 g.

TABLE 1

| | | | | | | Golf ball No. | | | | |
|---|---|---|---|---|---|---|---|---|---|---|
| | | | | | 1 | 2 | 3 | 4 | 5 | 6 |
| Mixture preparation step | Formulation (parts by mass) | (a) | Polybutadiene rubber | 100 | 100 | 100 | 100 | 100 | 100 |
| | | (b) | ZN-DA90S | 35 | 34 | 33 | 32 | 28 | 26 |
| | | (e) | Zinc oxide | 5 | 5 | 5 | 5 | 5 | 5 |
| | | Filler | Barium sulfate | AA* | AA* | AA* | AA* | AA* | AA* |
| | Kneading conditions | | Device | KN* | KN* | KN* | KN* | KN* | KN* |
| | | | Kneading time (minute) | 5 | 5 | 5 | 5 | 5 | 5 |
| | | | Kneading temperature (° C.) | 105 | 105 | 105 | 105 | 105 | 105 |
| Core rubber composition preparation step | Formulation (parts by mass) | Mixture | Polybutadiene rubber | 100 | 100 | 100 | 100 | 100 | 100 |
| | | | ZN-DA90S | 35 | 34 | 33 | 32 | 28 | 26 |
| | | | Zinc oxide | 5 | 5 | 5 | 5 | 5 | 5 |
| | | | Barium sulfate | AA* | AA* | AA* | AA* | AA* | AA* |
| | | (d) | PERHEXA C-40 | 0.95 | 0.95 | 0.95 | 0.95 | 0.95 | 0.95 |
| | | | PERHEXA HC | — | — | — | — | — | — |
| | | | PERCUMYL D | — | — | — | — | — | — |
| | | (c) | TMPT | 1 | 3 | 5 | 10 | 20 | 30 |
| | | | A-TMPT | — | — | — | — | — | — |

TABLE 1-continued

| | | | | | | | | |
|---|---|---|---|---|---|---|---|---|
| Kneading conditions | Device | | Roll | Roll | Roll | Roll | Roll | Roll |
| | Kneading time (minute) | | 5 | 5 | 5 | 5 | 5 | 5 |
| | Kneading temperature (° C.) | | 40 | 40 | 40 | 40 | 40 | 40 |
| | One-minute half-life temperature of component (d) (° C.) | | 153.8 | 153.8 | 153.8 | 153.8 | 153.8 | 153.8 |
| | Polymerization temperature of component (c) by heat (° C.) | | 140 | 140 | 140 | 140 | 140 | 140 |

| | | | | Golf ball No. | | | | |
|---|---|---|---|---|---|---|---|---|
| | | | | 7 | 8 | 9 | 10 | 11 |
| Mixture preparation step | Formulation (parts by mass) | (a) | Polybutadiene rubber | 100 | 100 | 100 | 100 | 100 |
| | | (b) | ZN-DA90S | 24 | 35 | 33 | 32 | 24 |
| | | (e) | Zinc oxide | 5 | 5 | 5 | 5 | 5 |
| | Filler | | Barium sulfate | AA* | AA* | AA* | AA* | AA* |
| | Kneading conditions | | Device | KN* | KN* | KN* | KN* | KN* |
| | | | Kneading time (minute) | 5 | 5 | 5 | 5 | 5 |
| | | | Kneading temperature (° C.) | 105 | 105 | 105 | 105 | 105 |
| Core rubber composition preparation step | Formulation (parts by mass) | Mixture | Polybutadiene rubber | 100 | 100 | 100 | 100 | 100 |
| | | | ZN-DA90S | 24 | 35 | 33 | 32 | 24 |
| | | | Zinc oxide | 5 | 5 | 5 | 5 | 5 |
| | | | Barium sulfate | AA* | AA* | AA* | AA* | AA* |
| | | (d) | PERHEXA C-40 | 0.95 | 0.95 | 0.95 | 0.95 | 0.95 |
| | | | PERHEXA HC | — | — | — | — | — |
| | | | PERCUMYL D | — | — | — | — | — |
| | | (c) | TMPT | 40 | — | — | — | — |
| | | | A-TMPT | — | 1 | 5 | 10 | 40 |
| | Kneading conditions | | Device | Roll | Roll | Roll | Roll | Roll |
| | | | Kneading time (minute) | 5 | 5 | 5 | 5 | 5 |
| | | | Kneading temperature (° C.) | 40 | 40 | 40 | 40 | 40 |
| | | | One-minute half-life temperature of component (d) (° C.) | 153.8 | 153.8 | 153.8 | 153.8 | 153.8 |
| | | | Polymerization temperature of component (c) by heat (° C.) | 140 | — | — | — | — |

KN*: Kneader,
AA*: Appropriate amount

TABLE 2

| | | | | Golf ball No. | | | | | | | | |
|---|---|---|---|---|---|---|---|---|---|---|---|---|
| | | | | 12 | 13 | 14 | 15 | 16 | 17 | 18 | 19 | 20 |
| Mixture preparation step | Formulation (parts by mass) | (a) | Polybutadiene rubber | 100 | 100 | 100 | 100 | 100 | 100 | 100 | 100 | 100 |
| | | (b) | ZN-DA90S | 32 | 32 | 32 | 32 | 35 | 32 | 32 | 32 | 35 |
| | | (e) | Zinc oxide | 5 | 5 | 5 | 5 | 5 | 5 | 5 | 5 | 5 |
| | Filler | | Barium sulfate | AA* | AA* | AA* | AA* | AA* | AA* | AA* | AA* | AA* |
| | Kneading conditions | | Device | KN* | KN* | KN* | KN* | KN* | KN* | KN* | KN* | KN* |
| | | | Kneading time (minute) | 5 | 5 | 5 | 5 | 5 | 5 | 5 | 5 | 5 |
| | | | Kneading temperature (° C.) | 105 | 105 | 105 | 105 | 105 | 105 | 105 | 105 | 105 |
| Core rubber composition preparation step | Formulation (parts by mass) | Mixture | Polybutadiene rubber | 100 | 100 | 100 | 100 | 100 | 100 | 100 | 100 | 100 |
| | | | ZN-DA90S | 32 | 32 | 32 | 32 | 35 | 32 | 32 | 32 | 35 |
| | | | Zinc oxide | 5 | 5 | 5 | 5 | 5 | 5 | 5 | 5 | 5 |
| | | | Barium sulfate | AA* | AA* | AA* | AA* | AA* | AA* | AA* | AA* | AA* |
| | | (d) | PERHEXA C-40 | 0.95 | 0.95 | — | — | 0.95 | — | 0.95 | — | 0.95 |
| | | | PERHEXA HC | — | — | — | — | — | 0.6 | — | — | — |
| | | | PERCUMYL D | — | — | 0.8 | 0.8 | — | — | — | 0.8 | — |
| | | (c) | TMPT | — | — | 10 | — | — | 10 | 10 | 10 | — |
| | | | A-TMPT | — | — | — | 10 | — | — | — | — | — |
| | | | EGDMA | 5.86 | — | — | — | — | — | — | — | — |
| | | | HDDMA | — | 7.52 | — | — | — | — | — | — | — |
| | Kneading conditions | | Device | Roll | Roll | Roll | Roll | Roll | Roll | Roll | Roll | Roll |
| | | | Kneading time (minute) | 5 | 5 | 5 | 5 | 5 | 5 | 5 | 5 | 5 |
| | | | Kneading temperature (° C.) | 40 | 40 | 40 | 40 | 40 | 40 | 40 | 40 | 40 |
| | | | One-minute half-life temperature of component (d) (° C.) | 153.8 | 153.8 | 175.2 | 175.2 | 153.8 | 149.2 | 153.8 | 175.2 | 153.8 |
| | | | Polymerization temperature of component (c) by heat (° C.) | — | — | 140 | — | — | 140 | 140 | 140 | — |

KN*: Kneader,
AA*: Appropriate amount

The materials used in Tables 1 and 2 are shown as follows.

Polybutadiene rubber: BR730 (high-cis polybutadiene rubber (cis-1,4 bond content=95 mass %, 1,2-vinyl bond content=1.3 mass %, Moony viscosity ($ML_{1+4}$ (100° C.)=55, molecular weight distribution (Mw/Mn)=3)) available from JSR Corporation ZN-DA90S: zinc acrylate (product containing 10 mass % of zinc stearate) available from Nisshoku Techno Fine Chemical Co., Ltd.

Zinc oxide: "Ginrei R" available from Toho Zinc Co., Ltd.

Barium sulfate: "Barium sulfate BD" available from Sakai Chemical Industry Co.

PERHEXA (registered trademark) C-40: 1,1-di(t-butylperoxy) cyclohexane available from NOF Corporation PERHEXA HC: 1,1-di(t-hexylperoxy) cyclohexane available from NOF Corporation PERCUMYL (registered trademark) D: dicumyl peroxide available from NOF Corporation TMPT: trimethylolpropane trimethacrylate available from Shin-Nakamura Chemical Co., Ltd.

A-TMPT: trimethylolpropane triacrylate available from Shin-Nakamura Chemical Co., Ltd.

EGDMA: ethylene glycol dimethacrylate available from Tokyo Chemical Industry Co., Ltd.

HDDMA: 1,6-hexanediol dimethacrylate available from Tokyo Chemical Industry Co., Ltd.

(2) Production of Spherical Core

The obtained core rubber compositions were extruded with an extruder to prepare plugs. The plugs were charged into upper and lower molds, each having a hemispherical cavity, and heat pressed according to the conditions shown in Tables 3 and 4 to obtain spherical cores. The compression deformation amount and hardness of the obtained spherical cores were measured, and the results are shown in Tables 3 and 4.

TABLE 3

| | | | Golf ball No. | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Core rubber composition | Formulation (parts by mass) | Polybutadiene rubber | 100 | 100 | 100 | 100 | 100 | 100 | 100 | 100 | 100 | 100 | 100 |
| | | ZN-DA90S | 35 | 34 | 33 | 32 | 28 | 26 | 24 | 35 | 33 | 32 | 24 |
| | | Zinc oxide | 5 | 5 | 5 | 5 | 5 | 5 | 5 | 5 | 5 | 5 | 5 |
| | | Barium sulfate | AA* | AA* | AA* | AA* | AA* | AA* | AA* | AA* | AA* | AA* | AA* |
| | | PERHEXA C-40 | 0.95 | 0.95 | 0.95 | 0.95 | 0.95 | 0.95 | 0.95 | 0.95 | 0.95 | 0.95 | 0.95 |
| | | PERHEXA HC | — | — | — | — | — | — | — | — | — | — | — |
| | | PERCUMYL D | — | — | — | — | — | — | — | — | — | — | — |
| | | TMPT | 1 | 3 | 5 | 10 | 20 | 30 | 40 | — | — | — | — |
| | | A-TMPT | — | — | — | — | — | — | — | 1 | 5 | 10 | 40 |
| | One-minute half-life temperature Td of component (d) (° C.) | | 153.8 | 153.8 | 153.8 | 153.8 | 153.8 | 153.8 | 153.8 | 153.8 | 153.8 | 153.8 | 153.8 |
| | Polymerization temperature Tc of component (c) by heat (° C.) | | 140 | 140 | 140 | 140 | 140 | 140 | 140 | — | — | — | — |
| Molding conditions | Molding temperature T2 (° C.) | | 130 | 130 | 130 | 130 | 130 | 130 | 130 | 130 | 130 | 130 | 130 |
| | Molding time (minute) | | 20 | 20 | 20 | 20 | 20 | 20 | 20 | 20 | 20 | 20 | 20 |
| | Temperature difference (Tc − T2) | | 10 | 10 | 10 | 10 | 10 | 10 | 10 | — | — | — | — |
| | Temperature difference (Td − T2) | | 23.8 | 23.8 | 23.8 | 23.8 | 23.8 | 23.8 | 23.8 | 23.8 | 23.8 | 23.8 | 23.8 |
| Core properties | Compression deformation amount (mm) | | 3.3 | 3.3 | 3.3 | 3.3 | 3.3 | 3.3 | 3.3 | 3.3 | 3.3 | 3.3 | 3.3 |
| | Center hardness Ho (Shore D) | | 55.6 | 55.7 | 58.5 | 55.8 | 57.7 | 60.8 | 62.6 | 55.5 | 58.0 | 56.1 | 63.0 |
| | Surface hardness Hs (Shore D) | | 78.3 | 78.1 | 77.9 | 78.7 | 78.1 | 78.4 | 77.8 | 78.1 | 78.5 | 77.8 | 77.6 |
| | Hardness difference (Hs − Ho) | | 22.7 | 22.4 | 19.4 | 22.9 | 20.4 | 17.6 | 15.2 | 22.6 | 20.5 | 21.7 | 14.6 |
| Ball evaluation | Compression deformation amount (mm) | | 3.0 | 3.0 | 3.0 | 3.0 | 3.0 | 3.0 | 3.0 | 3.0 | 3.0 | 3.0 | 3.0 |
| | Flight distance (yd) | | 5.6 | 5.3 | 4.8 | 4.2 | 2.8 | 1.4 | 0.0 | 5.4 | 4.6 | 4.1 | 0.0 |
| | Durability | | 100 | 120 | 140 | 160 | 180 | 190 | 200 | 100 | 140 | 160 | 200 |

AA*: Appropriate amount

TABLE 4

| | | | Golf ball No. | | | | | | | | |
|---|---|---|---|---|---|---|---|---|---|---|---|
| | | | 12 | 13 | 14 | 15 | 16 | 17 | 18 | 19 | 20 |
| Core rubber composition | Formulation (parts by mass) | Polybutadiene rubber | 100 | 100 | 100 | 100 | 100 | 100 | 100 | 100 | 100 |
| | | ZN-DA90S | 32 | 32 | 32 | 32 | 35 | 32 | 32 | 32 | 35 |
| | | Zinc oxide | 5 | 5 | 5 | 5 | 5 | 5 | 5 | 5 | 5 |
| | | Barium sulfate | AA* | AA* | AA* | AA* | AA* | AA* | AA* | AA* | AA* |
| | | PERHEXA C-40 | 0.95 | 0.95 | — | — | 0.95 | — | 0.95 | — | 0.95 |

TABLE 4-continued

| | | Golf ball No. | | | | | | | | |
|---|---|---|---|---|---|---|---|---|---|---|
| | | 12 | 13 | 14 | 15 | 16 | 17 | 18 | 19 | 20 |
| | PERHEXA HC | — | — | — | — | — | 0.6 | — | — | — |
| | PERCUMYL D | — | — | 0.8 | 0.8 | — | — | — | 0.8 | — |
| | TMPT | — | — | 10 | — | — | 10 | 10 | 10 | — |
| | A-TMPT | — | — | — | 10 | — | — | — | — | — |
| | EGDMA | 5.86 | — | — | — | — | — | — | — | — |
| | HDDMA | — | 7.52 | — | — | — | — | — | — | — |
| | One-minute half-life temperature Td of component (d) (° C.) | 153.8 | 153.8 | 175.2 | 175.2 | 153.8 | 149.2 | 153.8 | 175.2 | 153.8 |
| | Polymerization temperature Tc of component (c) by heat (° C.) | — | — | 140 | — | — | 140 | 140 | 140 | — |
| Molding conditions | Molding temperature T2 (° C.) | 130 | 130 | 170 | 170 | 130 | 130 | 170 | 130 | 170 |
| | Molding time (minute) | 20 | 20 | 20 | 20 | 20 | 20 | 20 | 20 | 20 |
| | Temperature difference (Tc − T2) | — | — | −30 | — | — | 10 | −30 | 10 | — |
| | Temperature difference (Td − T2) | 23.8 | 23.8 | 5.2 | 5.2 | 23.8 | 19.2 | −16.2 | 45.2 | −16.2 |
| Core properties | Compression deformation amount (mm) | 3.3 | 3.3 | 3.3 | 3.3 | 3.3 | 3.3 | 3.3 | 3.3 | 3.3 |
| | Center hardness Ho (Shore D) | 53.4 | 53.7 | 54.8 | 55.3 | 55.7 | 59.2 | 66.1 | 72.7 | 61.2 |
| | Surface hardness Hs (Shore D) | 76.4 | 76.3 | 79.7 | 79.4 | 78.5 | 77.9 | 76.5 | 74.2 | 79.3 |
| | Hardness difference (Hs − Ho) | 23.0 | 22.6 | 24.9 | 24.1 | 22.8 | 18.7 | 10.4 | 1.5 | 18.1 |
| Ball evaluation | Compression deformation amount (mm) | 3.0 | 3.0 | 3.0 | 3.0 | 3.0 | 3.0 | 3.0 | 3.0 | 3.0 |
| | Flight distance (yd) | 4.0 | 4.0 | 4.2 | 4.2 | 5.6 | 4.2 | 3.0 | 2.5 | 3.0 |
| | Durability | 140 | 140 | 80 | 80 | 100 | 160 | 70 | 100 | 80 |

AA*: Appropriate amount (3) Molding of Cover

The materials shown in Table 5 were mixed with a twin-screw kneading extruder to obtain the cover composition in a pellet form. The extruding conditions were a screw diameter of 45 mm, a screw rotational speed of 200 rpm, and screw L/D=35, and the mixtures were heated to 160° C. to 230° C. at the die position of the extruder.

TABLE 5

| Cover resin composition | | |
|---|---|---|
| Formulation (parts by mass) | Himilan 1605 | 50 |
| | Himilan 1706 | 50 |
| | Titanium oxide | 4 |
| Slab hardness (Shore D) | | 65 |

The materials used in Table 5 are shown as follows.

Himilan 1605: sodium ion neutralized ethylene-methacrylic acid copolymer ionomer resin available from Du Pont-Mitsui Polychemicals Co., Ltd.

Himilan 1706: zinc ion neutralized ethylene-methacrylic acid copolymer ionomer resin available from Du Pont-Mitsui Polychemicals Co., Ltd.

Titanium oxide: A220 available from Ishihara Sangyo Kaisha, Ltd.

The cover composition obtained above was injection molded on the spherical core obtained as described above to mold the cover covering the spherical core. Upper and lower molds for molding the cover have a hemispherical cavity and pimples, wherein a part of the pimples also serves as a retractable hold pin. When molding the cover, the hold pin was protruded to hold the core charged into the mold, and the resin heated to 210° C. to 260° C. was charged for 0.3 second into the mold held under a pressure of 80 tons, and cooled for 30 seconds, and the mold was opened to eject the golf ball.

The surface of the obtained golf ball body was subjected to a sandblast treatment, and a mark was formed thereon. Then, a clear paint was applied to the golf ball body, and the paint was dried in an oven of 40° C. to obtain a golf ball having a diameter of 42.8 mm and a mass of 45.4 g. The evaluation results of the obtained golf balls are shown in Tables 3 and 4.

The production methods No. 1 to 13, 17 and 19 are the cases that the rubber composition contains (c) the crosslinkable compound, and the molding temperature when molding the core falls within the range of from 100° C. to 150° C. The golf balls No. 1 to 13, 17 and 19 obtained by these production methods have excellent durability.

The production methods No. 14, 15 and 18 are the cases that the rubber composition contains (c) the crosslinkable compound but the molding temperature when molding the core exceeds 150° C. The golf balls No. 14, 15 and 18 obtained by these production methods have poor durability.

The production methods No. 16 and 20 are the cases that the rubber composition does not contain (c) the crosslinkable compound. The golf balls No. 16 and 20 obtained by these production methods have poor durability.

This application is based on Japanese patent application No. 2017-252826 filed on Dec. 28, 2017, the content of which is hereby incorporated by reference.

The invention claimed is:

1. A method for producing a golf ball comprising a spherical core and at least one cover layer covering the spherical core, wherein the method comprises:
   a first step of kneading (a) a base rubber, (b) an α,β-unsaturated carboxylic acid having 3 to 8 carbon atoms and/or a metal salt thereof as a co-crosslinking agent, (c) a crosslinkable compound having two or more polymerizable unsaturated bonds in a molecule thereof which excludes the α,β-unsaturated carboxylic acid having 3 to 8 carbon atoms and the metal salt thereof, and (d) a crosslinking initiator to prepare a core rubber composition containing at least (a) the base rubber, (b) the α,β-unsaturated carboxylic acid having 3 to 8 carbon atoms and/or a metal salt thereof, (c) the crosslinkable compound, and (d) the crosslinking initiator;
   a second step of producing the spherical core from the core rubber composition at a molding temperature in a range from 100° C. to 150° C.; and
   a third step of molding the at least one cover layer covering the spherical core on the spherical core,
   wherein a temperature difference (Tc-T2) between the molding temperature (T2) in the second step and a self-polymerization temperature (Tc) of (c) the crosslinkable compound by heat is 1° C. or more, and
a temperature difference (Td-T2) between the molding temperature (T2) in the second step and a one-minute half-life temperature (Td) of (d) the crosslinking initiator is 40° C. or less.

2. The method for producing the golf ball according to claim 1, wherein (c) the crosslinkable compound having two or more polymerizable unsaturated bonds in the molecule thereof is a crosslinkable compound having two or more (meth)acryloyl groups in a molecule thereof.

3. The method for producing the golf ball according to claim 1, wherein (c) the crosslinkable compound having two or more polymerizable unsaturated bonds in the molecule thereof is at least one member selected from the group consisting of trimethylolpropane tri(meth)acrylate, ethylene glycol di(meth)acrylate, and 1,6-hexanediol di(meth)acrylate.

4. The method for producing the golf ball according to claim 1, wherein the core rubber composition contains (c) the crosslinkable compound having two or more polymerizable unsaturated bonds in the molecule thereof in an amount of ranging from 2 parts by mass to 39 parts by mass with respect to 100 parts by mass of (a) the base rubber.

5. The method for producing the golf ball according to claim 1, wherein the core rubber composition contains (d) the crosslinking initiator in an amount of ranging from 0.1 part by mass to 5 parts by mass with respect to 100 parts by mass of (a) the base rubber.

6. The method for producing the golf ball according to claim 1, wherein the core rubber composition contains (e) a metal compound, and (e) the metal compound is also kneaded in the first step.

7. The method for producing the golf ball according to claim 1, wherein the core rubber composition contains (f) an organic sulfur compound and/or (g) a carboxylic acid and/or a metal salt thereof, and (f) the organic sulfur compound and/or (g) the carboxylic acid and/or a metal salt thereof is also kneaded in the first step.

8. The method for producing the golf ball according to claim 7, wherein the core rubber composition contains (g) the carboxylic acid and/or a metal salt thereof, and (g) the carboxylic acid and/or the metal salt thereof is at least one member selected from the group consisting of a saturated fatty acid, a metal salt of a saturated fatty acid, an aromatic carboxylic acid, and a metal salt of an aromatic carboxylic acid.

9. The method for producing the golf ball according to claim 1, wherein (c) the crosslinkable compound has a molecular weight in a range from 100 to 500.

10. The method for producing the golf ball according to claim 1, wherein (c) the crosslinkable compound has a self-polymerization temperature by heat (Tc) of 120° C. or more.

11. The method for producing the golf ball according to claim 1, wherein (d) the crosslinking initiator has a one-minute half-life temperature (Td) of less than 160° C.

12. The method for producing the golf ball according to claim 1, wherein in the first step, all the materials are kneaded at one time to prepare the rubber composition.

13. The method for producing the golf ball according to claim 1, wherein in the first step, the components other than the component (c) are kneaded to prepare a mixture, and then the mixture and the component (c) are kneaded to prepare the rubber composition.

14. The method for producing the golf ball according to claim 1, wherein in the first step, the components other than the component (c) and the component (d) are kneaded to prepare a mixture, and then the mixture, the component (c) and the component (d) are kneaded to prepare the rubber composition.

15. The method for producing the golf ball according to claim 14, wherein (d) the crosslinking initiator has a one-minute half-life temperature (Td) of less than 160° C.

16. The method for producing the golf ball according to claim 14, wherein a temperature difference (Td-T1) between a kneading temperature (T1) for preparing the rubber composition and a one-minute half-life temperature (Td) of (d) the crosslinking initiator is 40° C. or more.

17. The method for producing the golf ball according to claim 14, wherein a temperature difference (Tc-T1) between a kneading temperature (T1) for preparing the rubber composition and a self-polymerization temperature (Tc) of (c) the crosslinkable compound by heat is 10° C. or more.

18. The method for producing the golf ball according to claim 1, wherein
(c) the crosslinkable compound having two or more polymerizable unsaturated bonds in the molecule thereof is a crosslinkable compound having two or more (meth)acryloyl groups in a molecule thereof, and has a molecular weight in a range from 100 to 500.

* * * * *